May 30, 1933. B. H. FLYNN 1,911,184
CHAIN AND PULLEY ASSEMBLAGE
Filed Sept. 21, 1931
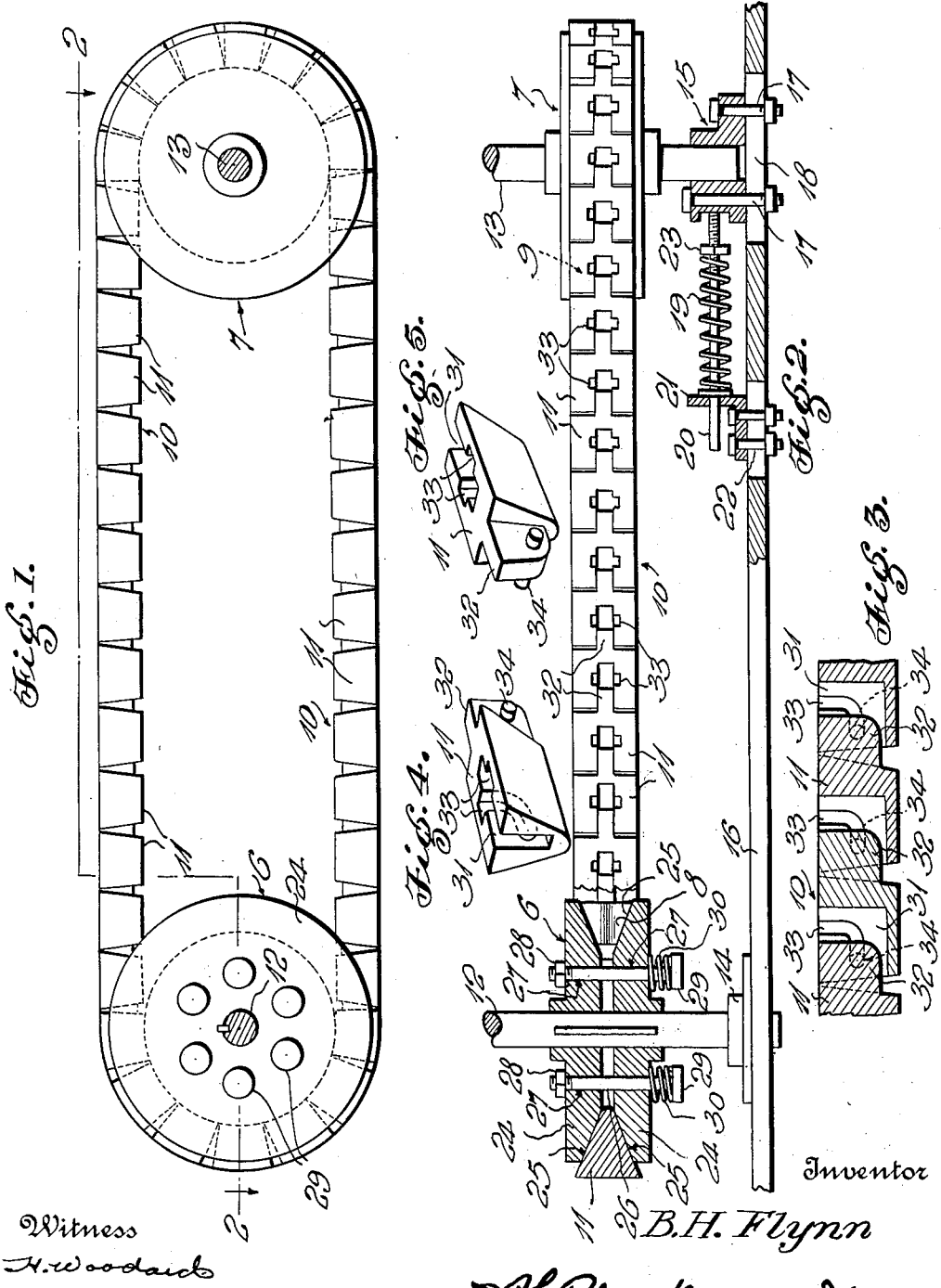

Patented May 30, 1933

1,911,184

UNITED STATES PATENT OFFICE

BENJAMIN H. FLYNN, OF ALEXANDRIA, LOUISIANA

CHAIN AND PULLEY ASSEMBLAGE

Application filed September 21, 1931. Serial No. 564,081.

In various mechanisms, sprocket wheels and co-acting chains are commonly employed for transmitting power, mounting conveyor flights, and various other purposes, but when subjected to earth, wet sand, gravel and other materials of granular nature, or of such nature that they will pack, clogging of chain links and sprockets often occurs, resulting either in breakage or in less severe trouble. Moreover, sudden overload often causes such a jerk on the chain as to break the same.

My invention aims to overcome the above mentioned difficulties in ways hereinafter described, and with this end in view, the invention resides in the novel subject matter hereinafter described and claimed, description being accomplished by reference to the accompanying drawing.

Fig. 1 is a side elevation of a chain and pulley assemblage embodying the invention.

Fig. 2 is a top plan view partly in horizontal section, as indicated by line 2—2 of Fig. 1.

Fig. 3 is a fragmentary longitudinal sectional view through several links of the chains.

Figs. 4 and 5 are perspective views of one of the links, looking in opposite directions.

A preferred structure has been shown and will be specifically described, with the understanding however that within the scope of the invention as claimed, variations may be made.

Two pulleys 6 and 7 are employed, having V-grooves 8 and 9 respectively, and a chain 10 having V-links 11, is provided, said pulleys and chain being of all-metal construction and the sides of the chain links being in frictional contact with the sides of the V-grooves 8 and 9. The pulleys 6 and 7 are carried by parallel shafts 12 and 13 respectively, shaft 12 being mounted in stationary bearings such as 14 while shaft 13 is mounted in shiftable bearings, one of which is illustrated at 15. The two bearings 14 and 15 are, for purposes of illustration, both shown mounted upon a frame bar 16. Bearing 15 is slidably connected with the bar 16 by means of bolts 17 passing through said bearing and through a slot 18 in said bar. A compression spring 19 urges the shaft 13 away from the shaft 12 to prevent slack in the chain 10. In the present showing, this spring surrounds a rod 20 projecting from the bearing 15, said rod passing slidably through an abutment 21 which is adjustably secured at 22 to the frame bar 16. One end of the spring 19 contacts with the abutment 21 and the other end of said spring abuts a nut 23 on the rod 20. By tightening this nut, the spring 19 may be placed under greater compression to cause said spring to exert greater force tending to move the shaft 13 away from the shaft 12, or by loosening said nut, the strength of the spring will be decreased. Hence, the sides of the V-links 11 may be caused to engage the sides of the V-grooves 8 and 9 with any required amount of friction, so as to produce the necessary driving force and still allow some slippage in case of overload.

The pulley 6 is laterally expansible and embodies two duplicate side sections 24 which are beveled at 25 to jointly form the V-groove 8, and spring means are provided to urge said side sections 24 toward each other, causing them to frictionally grip the chain 10 to produce an effective driving action and still allow slippage upon overload. Moreover, upon any sudden jerk upon the chain, the V-links thereof wedge further inwardly between the side sections 24 of the pulley 6 and these sections yield outwardly, so that the shock is so absorbed that there is no danger of chain breakage. Such inward wedging of the chain would loosen the latter, were it not for the spring means 19 exerting a constant pressure on shaft 13, but due to this pressure, loosening of the chain is prevented. Hence, both reaches of the chain are kept straight and the link pivots thereof are not subject to such great wear as would take place if one reach of the chain were slack, necessitating pivotal action of the links between the two pulleys as well as when passing around said pulleys.

In the present showing, tie-bolts 26 pass slidably through openings 27 in the pulley sections 24 and are provided with abutments 28 lying against the outer side of one of said sections, and with additional abutments 29 spaced outwardly from the outer side of the other of said sections. The abutments 28 and 29 may well be the conventional nuts and heads of ordinary bolts. Coiled compression springs 30 are interposed between the abutments 29 and the adjacent pulley section 24 so that the two sections of the pulley are urged toward each other to frictionally engage the chain.

Each link 11 of the chain 10 is a one-piece block having a socket 31 at one end and a tongue 32 at its other end. The socket 31 is flat-walled, opens through one end of the block 11 and through one longitudinal side of the latter, and its opposed side walls are provided with substantially L-shaped grooves 33 which at one end open through said one longitudinal side of the block and at their other ends turn toward said one end of said block. The tongue 32 is flat-sided and is provided with oppositely projecting trunnions 34 which are preferably formed integrally with said tongue. The tongue 32 of each link or block 11 is pivotally received in the socket 31 of the next adjacent link or block, the trunnions 34 being received in the grooves 33. A chain constructed in this manner when used with peripherally grooved pulleys, overcomes danger of clogging and moreover, the assemblage is also substantially proof against breakage from overload.

While the details disclosed may be considered as preferred, attention is invited to the fact that the present disclosure is for illustrative purposes only, and that within the scope of the invention as claimed, variations may be made.

I claim:—

An assemblage of the class described comprising a laterally expansible pulley composed of two side sections beveled to provide a V-groove, and spring means urging said side sections toward each other; a conventional pulley spaced from said expansible pulley and having a V-groove, a metal V-chain frictionally engaging the sides of the two V-grooves and formed of pivotally connected links, said chain being adapted under driving strain to wedge further toward the center of said expansible pulley, and spring means constantly urging one of said pulleys away from the other to maintain both reaches of the chain tight and straight regardless of the degree to which said chain wedges toward the center of the expansible pulley, thereby minimizing the pivotal action of said links.

In testimony whereof I affix my signature.

BENJAMIN H. FLYNN.